United States Patent
Cheltsov et al.

[15] 3,661,373
[45] May 9, 1972

[54] APPARATUS FOR FILTRATION OF MOLTEN METALS AND ALLOYS CONTAINING A SOLID PHASE

[72] Inventors: Vasily Mikhailovich Cheltsov, prospekt Kosmonavtov, 38, korpus 2, kv. 92; Sergei Petrovich Kosarev, Nalichnaya ulitsa, 39, korpus I, kv. 20; Nina Voldemarovna Didrikh, Moskovsky prospekt, 220, kv. 26, all of Leningrad, U.S.S.R.

[22] Filed: Aug. 28, 1970

[21] Appl. No.: 67,788

[52] U.S. Cl............................................266/34 T, 75/68
[51] Int. Cl.............................................................C21c 7/00
[58] Field of Search...............266/34 R, 34 T, 34 V; 75/53, 75/58, 62, 68, 94, 134, 143

[56] References Cited

UNITED STATES PATENTS 3,305,351   2/1967   Bylund.......................................75/68

*Primary Examiner*—Gerald A. Dost
*Attorney*—Holman & Stern

[57] ABSTRACT

An apparatus is proposed for filtration of molten metals and alloys characterized in that the metal collector of the apparatus is made in the form of a hermetically sealed lined chamber provided an internal gas heating system and with a device for removing the products of combustion.

2 Claims, 1 Drawing Figure

PATENTED MAY 9 1972
3,661,373
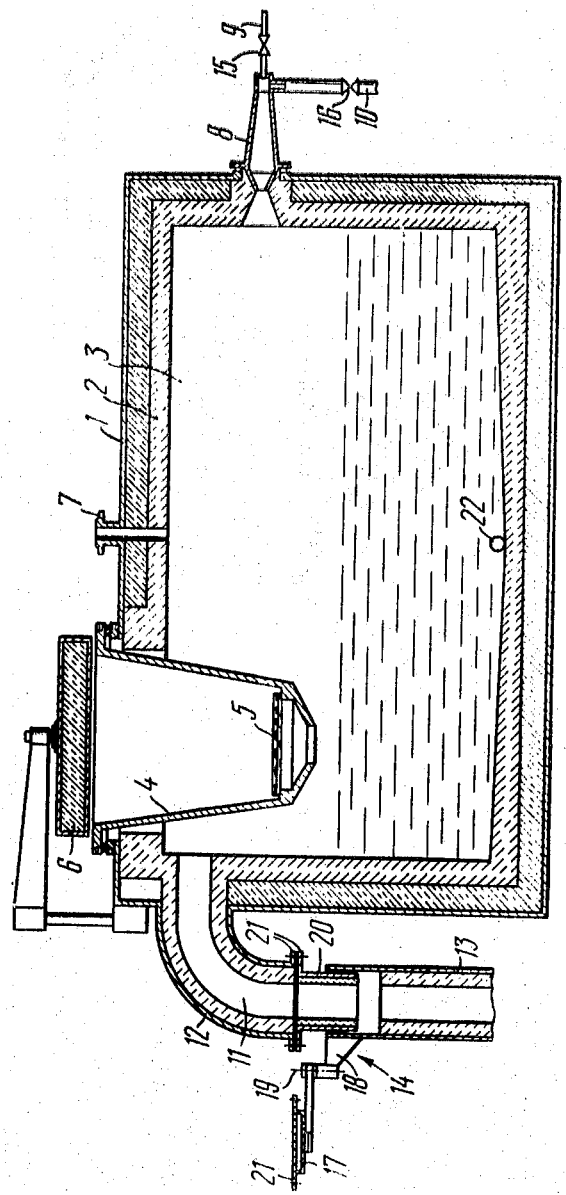

APPARATUS FOR FILTRATION OF MOLTEN METALS AND ALLOYS CONTAINING A SOLID PHASE

The present invention relates to metallurgy and, more specifically, the invention relates to the field of vacuum filtration of molten metals and alloys containing a solid phase, for example, used in manufacture of silumin including the process of filtration of a primary silicon-aluminum alloy for production of eutectic silumin.

Well known in the art are apparatus for vacuum filtration comprising a funnel with a filtering layer filled with a metal or alloy to be filtered and a metal collector connected with the funnel.

The metal collector made as a crucible heated by a gas on the outside is connected to a vacuum system producing a vacuum within the collector for complete separation of the liquid phase from the solid phase.

Such a metal collector has a limited capacity (it contains 3 to 5 tons of metal, and a relatively short service life as in the process of filtration at a high temperature (600°–800° C) it is subject to heavy mechanical loads due to the pressure of the external medium and the weight of the metal.

Owing to the limited capacity of the metal collector the apparatus for vacuum filtration features a low efficiency (less than 5 tons of metal per cycle) and requires a great number of replaceable crucibles.

An object of the present invention is to provide such a filtration apparatus which at a simple construction would have a high efficiency.

This and other objects are attained by providing an apparatus for filtration of molten metals and alloys containing a solid phase which, according to the invention, comprises a funnel with a filtering layer, a metal collector connected to the funnel and made in the form of a lined chamber, a vacuum system connected to this chamber for providing therein a vacuum assisting in better separation of the molten metal from the solid phase, at least a single gas burner with gas and air supply systems for burning the gas inside the chamber and a channel for removing the products of combustion, which channel is connected with the chamber.

In addition, the apparatus is equipped with attachments for hermetically sealing the chamber at the moment of filtration which are mounted on the system for supplying the gas and air to the burner and in the channel for removing the products of combustion from the chamber.

In the proposed apparatus the attachment for hermetically sealing the chamber mounted in the channel for removing the products of combustion is preferably provided with a water-cooled gate closing the channel in the place of interruption of the pipeline forming this channel, in which case a length of a pipe must be installed in this place with a possibility of moving along the channel axis.

The essence of the invention consists in the following.

The metal collector of the apparatus made as a hermetically sealed lined chamber provided with an inner gas heater and a system for removing the products of combustion makes it possible both to effect the filtration in this collector and to provide heating of the filtering funnel as well as to considerably increase the capacity thereof.

In this case it is possible to reduce the time of the cycle of filtration and to increase the efficiency of the apparatus.

The lining of the chamber considerably increases the life of the apparatus.

The invention may best be understood by reference to the following description when taken in connection with accompanying drawing which shows diagrammatically a longitudinal section of the apparatus.

The apparatus shown in the drawing consists of a hermetically sealed metal housing 1 with a lining 2 forming a chamber 3 for molten metal, a funnel 4 with a filtering layer 5, said funnel being lowered into the chamber 3, a heat-insulated cover 6, a branch pipe 7 for connection of the chamber 3 to a vacuum system (not shown), a gas burner 8 mounted into a wall of the chamber 3 and provided with systems 9 and 10 for supplying gas and air, a channel 11 for removing the products of combustion, which channel is formed by pipelines 12 and 13.

For sealing the chamber 3 at the moment of filtration, the channel 11 for removing the products of combustion and the systems 9 and 10 for supplying gas and air to the burner 8 are provided with attachments 14, 15 and 16.

The attachment 14 comprises a water-cooled gate 17 mounted on a bracket 18 with a possibility of turning about an axis 19—19 and displacement along a vertical line and a pipe length 20 arranged within the pipeline 13 at the joint of this pipeline with the pipeline 12, said pipe length 20 being capable of moving along the axis of the channel 11. The gate 17, pipeline 12 and pipe length 20 are provided with sealing flanges 21.

The attachments 15 and 16 consist of conventional locking devices used in pipelines, for example valves, slide gates etc.

The bottom of the chamber 3 has a tap hole 22 for discharging the filtrated metal.

The above-described apparatus is used in production of eutectic silumin from a primary silicon-aluminum alloy produced by means of thermal regeneration of porcelain clays.

The process of filtration in the above-said apparatus consists in the following. Prior to the process the chamber 3 and the funnel 4 with the filtering layer 5 are heated to a temperature of filtration (520°–550° C) with the help of a gas burner 8 fed with combustible gas and air through the systems 9 and 10. In this case the pipe length 20 is pressed to the flange 21 of the pipeline 12 and connects the latter with the pipeline 13.

After obtaining the temperature of filtration, the heating is ceased and the chamber 3 is hermetically sealed.

This is obtained by means of the attachments 15 and 16 provided on the systems 9 and 10 for supplying gas and air and the attachment 14 in the channel 11 for removing the products of combustion of the gas.

In the attachment 14 the pipe length 20 is lowered, in which case a gap is formed between the pipelines 12 and 13. The gate 17, while being rotated about the axis 19-19, is introduced into this gap and through the flange 21 is pressed to the same flange of the pipeline 12. Thus, the channel 11 is closed.

After sealing the chamber the vacuum system is operated which is connected with the chamber through the branch pipe 7 and creates within the chamber a vacuum (400 mm Hg column) required for the filtration and, at the same time, the silicon-aluminum alloy containing solid intermetallides is poured through the funnel 4 onto the filtrating layer 5.

Under the effect of the vacuum the liquid silumin is filtrated and is collected in the chamber 3.

The solid intermetallides are retained on the filtrating layer 5 of the funnel 4. After the filtration, the filtrating layer together with the intermetallides is removed from the funnel 4 and the latter is covered with the heat-insulated cover 6.

As the filtration is effected at a temperature of the alloy close to the eutectic temperature, i.e. 520°–550° C, the silumin is heated to 650° C for subsequent casting.

In this case the water-cooled gate 17 is moved aside, the pipelines 12 and 13 for removing the products of combustion are interconnected through the pipe length 20 and the gas burner 8 is put into operation. The heated alloy is poured through the tap hole 22 into moulds of a casting conveyer (not shown).

Thus, the above-described apparatus functions as follows.

It separates the solid intermetallides from the molten eutectic silumin, heats the filtered silumin to a casting temperature and serves as a capacity from which the produced silumin is poured into moulds of a conveyer or is consumed in any other way.

The above-described apparatus makes it possible to filter out up to 12–15 tons of silumin per cycle.

We claim:

1. An apparatus for filtration of molten metals and alloys containing a solid phase comprising in combination: a funnel, a filtering layer of said funnel, a metal collector connected to the funnel and made in the form of a lined chamber, a vacuum system connected to said chamber for creating a vacuum therein for better separation of the molten metal from the solid phase, at least one gas burner for combustion of a gas within said chamber, systems for supplying combustible gas and air to said burner, a channel for removing the products of combustion connected to said chamber and attachments for hermetically sealing the chamber provided in the system for supplying gas and air to the burner and in the channel for removing the products of combustion.

2. An apparatus as claimed in claim 1 in which the attachment for hermetically sealing the chamber mounted in the channel for removing the products of combustion is provided with a water-cooled gate closing the channel, in which case in the place of interruption of the pipeline forming this channel there is mounted a length of a pipe capable of moving along the axis of the channel.

* * * * *